April 19, 1938.  E. A. GESSNER  2,114,921

VALVE

Filed Nov. 18, 1935

INVENTOR
E. A. Gessner
By Watson, Cait, Morse & Grindle
Attorneys

Patented Apr. 19, 1938

2,114,921

UNITED STATES PATENT OFFICE 2,114,921

VALVE

Ernst Alexander Gessner, Aue, Germany

Application November 18, 1935, Serial No. 50,445
In Germany May 6, 1935

7 Claims. (Cl. 251—147)

This invention relates to valves for gases, vapors, liquids and the like. The valves according to the invention are constructed so that not only the valve body, but also the valve seat are made in stream-line shape. Herefrom results the great advantage that eddies are avoided as far as possible during the operation of the valves, the more so as the elements actuating the valve are made in stream-line shape within the range of flow through the valve, or, if this should not be possible, covered in stream line shape.

Details of the construction are shown in the accompanying drawing in which several embodiments of the invention are illustrated by way of example.

Figure 1:
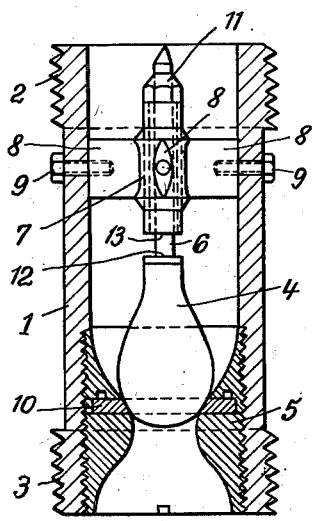
Fig. 1 shows a valve in section.

The valve shown in Fig. 1 is located in a tubular conduit or casing 1 having screwthreaded connecting parts 2, 3. This valve consists essentially of a valve body 4 and a valve seat 5. The seat as well as the body are stream-line shaped so that little resistance is offered to the flowing medium. The spindle or stem 6 of the valve body 4 hangs in a guide body 7, which, by means of stream-line-shaped arms 8 is fixed by screws 9 or the like in the tubular casing 1. A disc or washer 10 of leather, rubber or other suitable material in the valve seat 5 serves to improve the packing. When the medium flows through the casing 1 the valve body 4 is lifted. The height of the stroke can be regulated by a screw 11. If the valve body is lifted, the end face 12 of the valve body 4 bears against the guide body 7.

Figure 3:
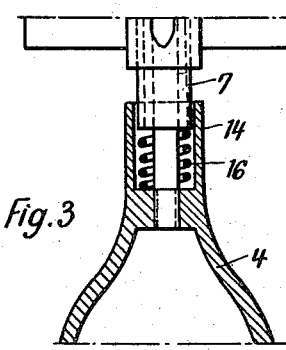
Fig. 3 shows on an enlarged scale a portion of a valve of the type shown in Fig. 1.

In Fig. 3 the upper portion 14 of the valve body 4 engages like a ring-shaped mantle over the lower portion of the guide body 7, so that, also in closed state, a substantially smooth stream-line exists at the portion between guide body 7 and valve body 4.

Figure 4:
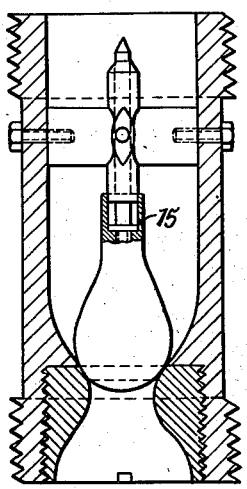
Fig. 4 is a section showing a valve of similar construction to that shown in Fig. 1.
Figure 7:
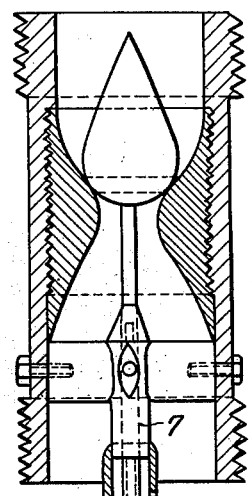
Fig. 7 shows in section a valve of a fifth form of construction.
Figure 2:
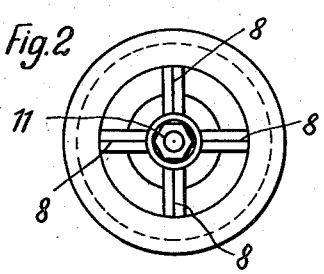
Fig. 2 is a top plan view of Fig. 1.
Figure 5:
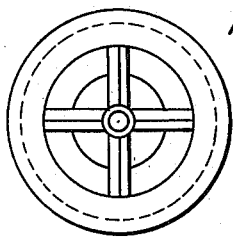
Fig. 5 is the corresponding top plan view of Fig. 4.
Figure 6:
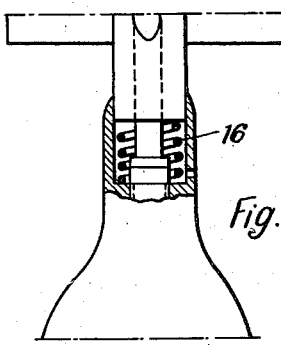
Fig. 6 shows on an enlarged scale a portion of a valve of the type shown in Fig. 1.
Figure 8:
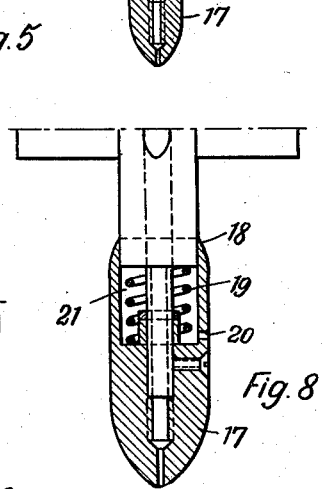
Fig. 8 shows on an enlarged scale a portion of a valve of the type shown in Fig. 7.

Fig. 4 shows a valve with a similar construction to that of Fig. 3, but employing a dashpot instead of a spring. An opening 15 provides escape for the air during the pressing together. A special spring 16 (Figs. 3 and 6) may be provided to ensure closing of the valve. The valve may, however, be suspended as in Fig. 7. The loading weight 17 is of stream line shape. It engages over the guide body 7 in a similar manner as the valve body 4 in Figs. 3 and 6. Fig. 8 shows the weight 17 with upper edge 18 bevelled in stream line shape. A loading spring 19 may also be provided similar to those shown in Figures 3 and 6, and a bore 20 serves for the venting of the chamber 21 formed by the wall.

By making the holes 20 narrow (Fig. 8) the lift may be cushioned, so that sudden shocks of flow cannot cause the valves to run untrue.

I claim:—

1. In a valve construction for gases, vapors, liquids and the like, in combination, a valve seat, a valve body member movable downwardly to and upwardly from said seat to close and open the valve, a supporting structure for said valve body member bridging the passageway through which the fluid medium flows, a valve stem guided by said supporting structure and having a resilient connection therewith, and a weight carried by said valve stem and adapted to urge the valve to closed position, said valve body member, seat, supporting structure and weight being streamlined to prevent eddy currents, said weight formed with a portion adapted to enclose said resilient connection to further streamline the valve construction.

2. In a valve construction for gases, vapors, liquids and the like, in combination, a valve seat, a valve body member movable downwardly to and upwardly from said seat to close and open the valve, a supporting structure for said valve body member bridging the passageway through which the fluid medium flows, a valve stem guided by said supporting structure, a weight member carried by said valve stem and adapted to urge said valve toward closed position, a recess in said weight adapted to receive a portion of said supporting means and providing a cushioning means for said valve, and a spring within said recess also adapted to urge said valve to closed position, said valve body member, seat, supporting structure and weight member being streamlined to prevent eddy currents.

3. In a valve construction for gases, vapors, liquids and the like, in combination, a valve seat, a valve body member movable downwardly to and upwardly from said seat to close and open the valve, a supporting structure for said valve body member bridging the passageway through which the fluid medium flows, a valve stem guided by said supporting structure, a weight member carried by said valve stem and adapted to urge said valve toward closed position, and a recess in said weight adapted to receive a portion of said supporting means and providing a cushioning means for said valve, said valve body member, seat, supporting structure and weight member being streamlined to prevent eddy currents.

4. In a valve construction for gases, vapors, liquids and the like, in combination, a valve seat, a valve body member movable downwardly to and upwardly from said seat to close and open the valve, a stem on said valve, means projecting into the passageway through which the fluid medium flows and serving to guide said stem, a weight carried by said stem and adapted to urge said valve body member toward closed position, mutually contacting surfaces on said means and said weight whereby said weight also is guided during its movement.

5. In a valve construction for gases, vapors, liquids and the like, in combination, a valve seat, a valve body member movable downwardly to and upwardly from said seat to close and open the valve, a weight member supported from said valve body member, and means projecting into the passageway through which the fluid medium flows for guiding said valve body member in its movements and also contacting and guiding said weight member.

6. In a valve construction for gases, vapors, liquids or the like, in combination, a streamlined valve seat, a valve assembly movable as a unit downwardly to and upwardly from said seat to close and open the valve, a streamlined supporting structure bridging the passageway through which the fluid medium flows, and provided with a portion adapted to contact with and guide said valve assembly, a compression spring member between said supporting structure and valve body assembly adapted to urge said assembly into valve closed position, said valve assembly being formed with a hood portion adapted to enclose said spring member at all times to further streamline the valve construction.

7. In a valve construction for gases, vapors, liquids or the like, in combination, a streamlined valve seat, a valve assembly movable as a unit to and from said seat to close and open the valve, a streamlined supporting structure projecting into the passageway through which the fluid medium flows, and provided with a portion adapted to contact with and guide said valve assembly, a resilient connection between said supporting structure and valve body assembly adapted to urge said assembly toward one of its limiting positions, said valve assembly and said supporting structure being formed with cooperating portions adapted to enclose said resilient connection at all times to further streamline the valve construction.

ERNST ALEXANDER GESSNER.